Figure 2:
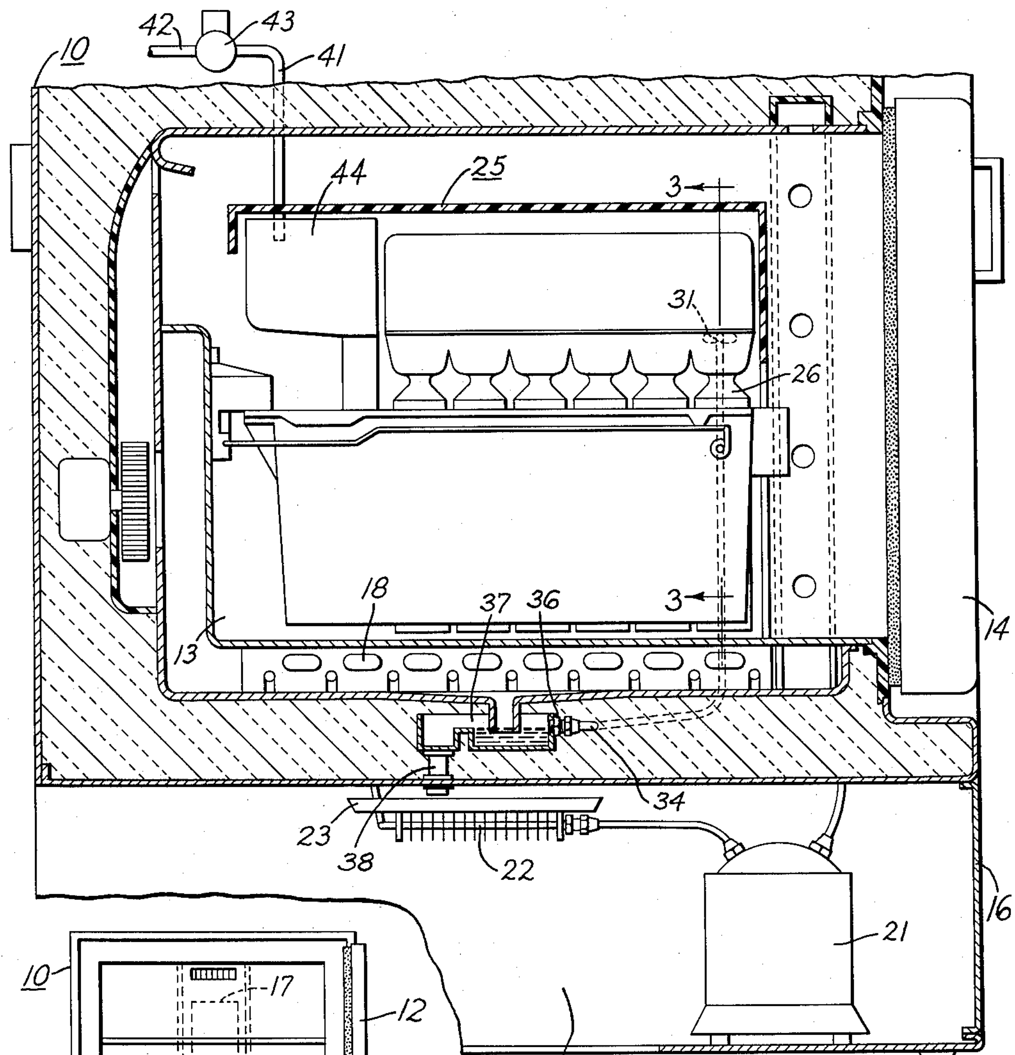

June 26, 1962 P. DE VINCENT 3,040,546

REFRIGERATING APPARATUS

Filed April 24, 1961 2 Sheets-Sheet 1

INVENTOR.
PATSY DEVINCENT
BY
Lloyd M. Keighley
HIS ATTORNEY

REFRIGERATING APPARATUS

Filed April 24, 1961 2 Sheets-Sheet 2

INVENTOR.
PATSY DeVINCENT
BY
Lloyd M. Keighley
HIS ATTORNEY

United States Patent Office 3,040,546

Patented June 26, 1962

1

3,040,546

REFRIGERATING APPARATUS

Patsy De Vincent, Dayton, Ohio, assignor to General Motors Corporation, Detroit, Mich., a corporation of Delaware Filed Apr. 24, 1961, Ser. No. 105,003
3 Claims. (Cl. 62—347)

This invention relates to refrigerating apparatus and particularly to a household refrigerator in which an automatically operated ice block producing device is located within a frozen food storage or freezing chamber thereof.

Some household refrigerator cabinets are provided with an insulated unfrozen food storage chamber and a separate insulated frozen food storage or freezing chamber in which it has been feasible or convenient to mount an automatically operated ice block producing device or mechanism. Such a device or mechanism is usually connected by conduit means with a source of fresh water supply externally of the refrigerator cabinet for refilling mold cavities of the device after ice blocks have been removed therefrom and is provided with means for controlling flow of refill water from the source of supply thereof into the mold cavities. This water flow control means is intended to measure a specific amount of water conducted or admitted to a mold cavity. To date, however, these water control means are not at all times infallible and are therefore not entirely satisfactory. For example, they may be too slow in shutting off incoming water to a mold of an ice block maker or the water pressure in the water main may increase and allow too much water to flow into cavities of the mold of an ice maker. Also, one or more ice blocks may not at certain times be ejected from cavities of a mold of an ice maker thus temporarily reducing the water capacity of the mold in comparison to the amount of refill water admitted thereto. As a result of these inadequacies mold cavities in an ice block maker mounted in a frozen food storage or freezing chamber of a household refrigerator cabinet are frequently overfilled with water and the excess water overflows the mold and is deposited on the floor of the freezing chamber or on packages of frozen food stored in the chamber. This overflow water is a problem of little concern in commercial ice makers or apparatuses and while the same freezes in a chamber of a household refrigerator cabinet it nevertheless presents an unsightly and unclean condition therein which is highly objectionable to the user of a domestic refrigerator and should be eliminated.

It is an object of my invention to provide an improved ice block making device in a freezing chamber of a household refrigerator cabinet.

Another object of my invention is to provide means whereby it is impossible to overfill mold cavities in an ice block producing device mounted in a frozen food storage or freezing chamber of a household refrigerator cabinet to thereby eliminate water flow from the device into the chamber.

A further object of my invention is to provide a mold of an ice block producing device located in a freezing chamber of a household refrigerator with an overflow drain means which will convey excess water sometimes admitted to cavities in the mold to the exterior of the chamber for disposal of this excess water or for disposing of other waste water from the device occasioned during ice producing functions thereof.

In carrying out the foregoing object it is a still further and more specific object of my invention to vaporize excess water overflowing an ice maker in a household refrigerator cabinet or waste water resulting from ice producing cycles of the ice maker with heat produced by a heat generating unit of a refrigerating system associated with the refrigerator and to dissipate the vapor into air ambient the cabinet.

2

Further objects and advantages of the present invention will be apparent from the following description, reference being had to the accompanying drawings wherein a preferred embodiment of the present invention is clearly shown.

Figure 1:
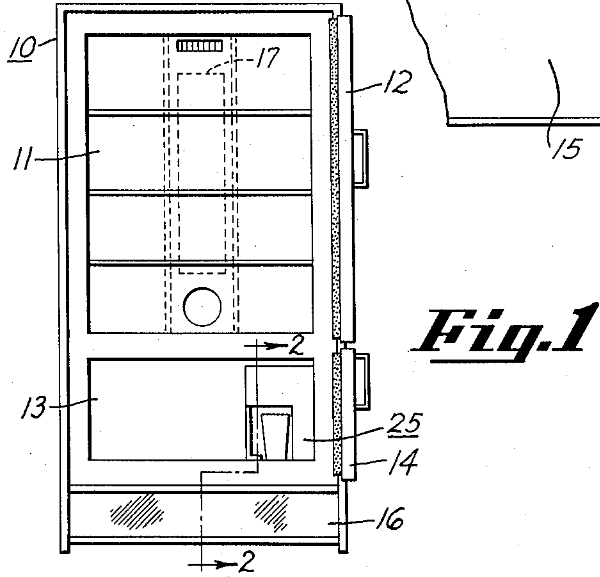
Figure 3:
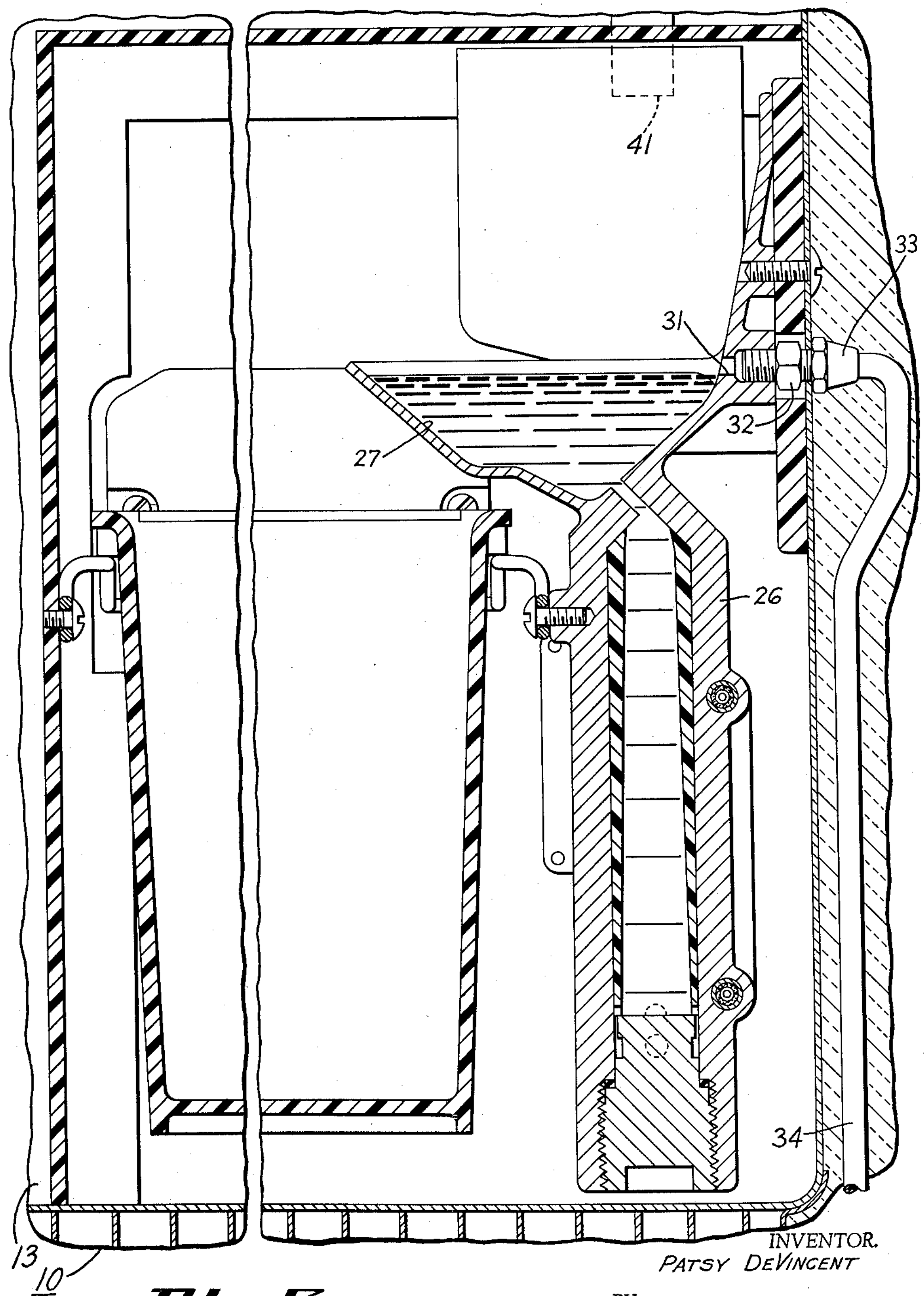

In the drawings:

FIGURE 1 is a front view of a multiple chambered refrigerator cabinet with doors of the chamber opened to show an ice maker or ice producing device located in the frozen food storage or freezing chamber thereof having my invention embodied therein;

FIGURE 2 is an enlarged fragmentary sectional view taken along the line 2—2 of FIGURE 1 showing a side view of the automatic ice block producing device in the freezing chamber above a machine compartment of the refrigerator cabinet; and FIGURE 3 is an enlarged fragmentary sectional view taken along the line 3—3 of FIGURE 2 showing an overflow drain means associated with a cavity of a mold of the ice maker located in the refrigerator cabinet.

Before proceeding with a description of the present invention it is desired to point out that my disclosure is particularly applicable to household refrigerator cabinets equipped with an automatically operable ice block maker as distinguished from commercial ice makers or apparatuses. In this respect my invention is adapted to overcome a problem which exists in household refrigerators of the type disclosed in the copending application of W. G. Kniffin Serial No. 63,851 filed October 20, 1960, entitled "Ice Maker Control System" and assigned to the assignee of instant application. Reference is made to this copending application to simplify illustration and minimize the description of the present disclosure. While I herein illustrate a means to prevent refill water admitted to a mold of an ice block maker or device in a household cabinet from overflowing cavities of the mold, my invention is equally capable of disposing of waste water occasioned by functions of an ice maker such, for example, as waste water resulting from thawing ice blocks loose from a mold and retaining the wetted ice blocks until dried prior to dumping them into an ice storage receptacle.

Referring to the drawings, I show in FIGURE 1 thereof an ice block maker or producing apparatus or device of the character fully described and more specifically disclosed in the copending application heretofore identified installed in a freezing chamber of a household refrigerator cabinet for the purpose of illustrating my invention. The refrigerator includes a cabinet 10 provided with an upper insulated unfrozen food storage chamber 11, normally closed by a door 12, a separate lower insulated freezing or frozen food storage chamber 13 normally closed by a door 14, and a machine compartment 15 below chamber 13. The machine compartment is closed at its front by a closure door or panel 16 and is vented to air ambient cabinet 10 such as by having its back wall open. The interior of chambers 11 and 13 are refrigerated by circulating air to and fro, same cooled by evaporators 17 and 18 respectively of a refrigerating system associated or allied with the refrigerator cabinet 10 in the manner described in said copending application of W. G. Kniffin and it is unnecessary to herein duplicate such description. The temperature of air in chamber 11 is maintained by evaporator 17 at approximately 40° F. and the air in chamber 13 is maintained by evaporator 18 at a very low temperature well below 32° F. between, for example 0° and 10° F. in order to freeze water in the mold of the ice block maker or ice producing device located in the frozen food or freezing chamber. The refrigerating system includes, in addition to evaporators 17 and 18, a heat generating refrigerant translating device or unit which, in the present disclosure, is in the form of a motor-compressor-condenser type suitably mounted in the vented machine compartment 15 of cabinet 10. This heat generating unit comprises an electric motor drivingly connected to a refrigerant compressor, both sealed within a casing 21, and a refrigerant condenser 22 preferably located in thermal conductive relationship with an evaporator defrost water receiving drain pan 23 disposed in machine compartment 15. Pipes or conduits connect the compressor in casing 21 to condenser 22 and the evaporators 17 and 18 to the condenser and to casing 21 in closed fluid conducting relationship as is conventional in the art. Patents to L. J. Mann #2,912,834 dated November 17, 1959, and L. J. Mann et al. #2,959,936 dated November 15, 1960, are made of reference as exemplifying a more specific or full disclosure of the type of refrigerating apparatus and its control herein associated or allied with the household refrigerator cabinet 10.

The ice block freezing or producing device, generally designated by the reference numeral 25, stationarily located or mounted in the low temperature frozen food chamber 13 of cabinet 10 includes or comprises a mold 26 (see FIGURES 2 and 3) provided with walls defining a plurality of cavities therein (see FIGURE 3) adapted to receive and retain a body of water to be frozen into ice blocks in the device 25. This device or apparatus 25 also comprises means for automatically ejecting the ice blocks when formed in mold 26 from walls of the cavities 27 into an ice block storage bucket or receptacle as and for the purpose fully disclosed in the copending application to W. G. Kniffin referred to. While I show one type of automatic ice block maker or producing device it is to be understood that my invention is not restricted to this particular illustration since the subject matter of the appended claims is to be considered as being of a scope including various other types of ice block makers or machines located in a chamber of a household refrigerator cabinet. By referring to the copending application and patents hereinbefore identified, together with the present illustration and concise explanation, it is believed that one familiar with this art will obtain a clear understanding of my invention from the following description thereof.

In accordance with the objects herein set forth I provide mold 26 with an overflow means in the form of a bore or aperture 31 in a wall of a cavity or cavities 27 therein below the top wall of the mold (see FIGURE 3). A pipe fitting 32 is threaded into tapped threads provided in aperture 31 and a coupling 33, located beyond the liner or metal wall of chamber 13, carrying or supporting one end of a conduit or drain pipe 34 is attached or coupled to fitting 32. Conduit or pipe 34 extends downwardly through the insulating material bounding walls or the liner of chamber 13 and has its other or opposite end attached, as at 36, to a combined water seal trap and defrost water receiving drain receptacle 37, forming part of the refrigerator cabinet 10, which is connected to a pipe 38 leading therefrom to the drain pan 23 located within machine compartment 15. This arrangement provides a fluid conveying means associated with the ice making or producing device 25 for conducting or exhausting excess water or waste water directly therefrom to the exterior of freezing chamber 13 to a point therebeyond whereby the water may be disposed of and so as to prevent overflow of mold cavities 27 of mold 26 into the chamber. During operation of the refrigerating apparatus allied with cabinet 10 and of the ice maker to produce ice blocks in chamber 13 ice blocks are, when formed in mold 26, automatically ejected from walls of the mold cavities 27 and fresh water from a source of supply thereof, such as conduit or pipe 41 connected to a water main 42 by a solenoid or otherwise actuated valve or the like element 43, is periodically admitted, under control of valve 43, to the mold 26 by way of a funnellike box 44 (see FIGURES 2 and 3) for refilling the open top chambers or cavities in the ice block producing device 25. Such valve 43 is intended to normally direct or admit an amount of water to the mold cavity or cavities 27 for refilling same to a predetermined level therein as shown in FIGURE 3 of the drawings. Should control valve 43 or other similar valve employed for this mold cavity refilling cycle or operation momentarily stick open or be caused to close too slowly after being opened and/or should the pressure in water main 42 temporarily be increased when valve 43 is opened, an excessive amount of water greater than the mold cavity refilling capacity will be directed or admitted to cavities 27. The excess incoming water to mold 26 would ordinarily, without my invention, overflow walls of the mold cavities 27, run into chamber 13 and onto or under packages of frozen foods stored therein. The overflow water will, of course, freeze in chamber 13 and ice layers or deposits of ice therein are at least objectionable and may prevent separating a certain packaged food product from other packages thereof or may prevent ease of removing a package from the chamber. This objection and difficulties resulting from overflow water from an ice maker in a household refrigerator cabinet freezing in chamber 13 are overcome by the present disclosure.

When, as before stated, a mold cavity water refilling valve or the like of an ice maker fails to function properly it measures or admits more than a prescribed amount of water to cavities 27 of mold 26 and the excess water will be conveyed or exhausted to the exterior of chamber 13. For example, if valve 43 temporarily sticks after being opened, is slow in closing, does not seat properly and/or if pressures rise abnormally in the water main 42, excess water entering the cavities 27 of mold 26 will flow into aperture 31 and out of chamber 13 to insure refilling of the mold cavities only to a predetermined level therein. This excess water is conveyed or conducted from aperture 31 by way of the overflow means, drain pipe 34, into the combined trap and defrost water receptacle 37 and thence into drain pan 23 by way of pipe 38. Pan 23 is heated substantially continuously by the heat generating refrigerant translating unit, particularly condenser 22, of the refrigerating system located in machine compartment 15. Therefore excess water improperly directed to mold 26 or, in other words, waste water occasioned by or during ice block producing functions of ice maker 25 and overflowing the mold cavities 27 into pan 23 is vaporized by heat of the heat generating unit in an amount sufficient to insure that water will not overflow the pan. This vapor is expelled from pan 23 into compartment 15 from where it is dissipated to air ambient the refrigerator cabinet 10. In this manner I provide an improved ice block producing device for use in household refrigerator cabinet which is devoid of creating a troublesome condition within the freezing chamber of the cabinet and which is also free of causing objectionable, unclean or unsightly deposits of ice in the freezing chamber. While I am aware of the fact that it is not broadly new to vaporize water from a drip tray in a machine compartment of a refrigerator cabinet, I nevertheless put such a drip tray already present in household refrigerator cabinets, to an additional use and have thereby along with providing an ice block producing device in such a refrigerator with my water overflow means made a novel combination for solving a problem in the art.

While the embodiment of the present invention as herein disclosed constitutes a preferred form, it is to be understood that other forms might be adopted.

What is claimed is as follows:

1. In combination, a household refrigerator cabinet having an insulated normally dry packaged frozen food storage chamber therein and a machine compartment below said chamber, a refrigerating system allied with said cabinet, said system comprising a refrigerant evaporator cooling the entire interior of said chamber to a temperature well below 32° F. for maintaining food stored therein frozen and a heat generating refrigerant translating unit located in said machine compartment, an ice producing device within said chamber adjacent frozen foods therein, said device including a mold provided with walls defining sides and the bottom of an open top cavity disposed in an upright position for receiving and retaining a body of water to be frozen into an ice block, said device also including means for ejecting the ice block when formed in said mold from walls of the cavity, a conduit communicating with said device and with a source of water supply externally of said cabinet, means for periodically admitting a measured amount of water through said conduit to said mold for refilling the open top cavity with a body thereof up to a predetermined level to be retained therein after ejection of the ice block therefrom, a pipe connected to said mold at said predetermined level of the body of water contained in the cavity thereof, said pipe being unexposed to the low temperature within said chamber and leading directly from said mold out of the chamber, said pipe draining water from said mold cavity in excess of the body thereof therein above said predetermined level, as occasioned by a malfunction of said water admitting means, into said machine compartment, and the excess water being vaporized by said heat generating unit of the refrigerating system within said machine compartment and dissipated to air ambient said cabinet.

2. In combination, a household refrigerator cabinet having an insulated normally dry packaged frozen food storage chamber therein and a machine compartment below said chamber, a refrigerating system allied with said cabinet, said system comprising a refrigerant evaporator cooling the entire interior of said chamber to a temperature well below 32° F. for maintaining food stored therein frozen, an ice producing device within said chamber adjacent frozen foods therein, said device including a mold provided with walls defining sides and the bottom of an open top cavity disposed in an upright position for receiving and retaining a body of water to be frozen into an ice block, said device also including means for ejecting the ice block when formed in said mold from walls of the cavity, a conduit communicating with said device and with a source of water supply externally of said cabinet, means for periodically admitting a measured amount of water through said conduit to said mold for refilling the open top cavity with a body thereof up to a predetermined level to be retained therein after ejection of the ice block therefrom, a pipe connected to said mold at said predetermined level of the body of water contained in the cavity thereof, said pipe being unexposed to the low temperature within said chamber and leading directly from said mold out of the chamber, and said pipe draining water from said mold cavity in excess of the body thereof therein above said predetermined level, as occasioned by a malfunction of said water admitting means, to the exterior of said normally dry frozen food storage chamber whereby to prevent the excess water from overflowing walls of said mold and freezing within the chamber.

3. In combination, a household refrigerator cabinet having an insulated normally dry packaged frozen food storage chamber therein and a machine compartment below said chamber, a refrigerating system allied with said cabinet, said system comprising a refrigerant evaporator cooling the entire interior of said chamber to a temperature well below 32° F. for maintaining food stored therein frozen, an ice producing device within said chamber adjacent frozen foods therein, said device including a mold provided with walls defining sides and the bottom of an open top cavity disposed in an upright position for receiving and retaining a body of water to be frozen into an ice block, said device also including means for ejecting the ice block when formed in said mold from walls of the cavity, a conduit communicating with said device and with a source of water supply externally of said cabinet, means for periodically admitting a measured amount of water through said conduit to said mold for refilling the open top cavity with a body thereof up to a predetermined level to be retained therein after ejection of the ice block therefrom, a pipe connected to said mold at said predetermined level of the body of water contained in the cavity thereof, said pipe being unexposed to the low temperature within said chamber and leading directly from said mold out of the chamber, and said pipe draining water from said mold cavity in excess of the body thereof therein above said predetermined level, as occasioned by a malfunction of said water admitting means, to the exterior of said normally dry frozen food storage chamber, and heat generating means outside said chamber associated with said refrigerator cabinet for vaporizing the excess water drained out of the chamber to air ambient the cabinet.

References Cited in the file of this patent

UNITED STATES PATENTS

| | | |
|---|---|---|
| 2,682,155 | Ayres | June 29, 1954 |
| 2,709,343 | Muffly | May 31, 1955 |
| 2,716,865 | Stickel | Sept. 6, 1955 |
| 2,763,993 | Bayston | Sept. 25, 1956 |